(No Model.) 2 Sheets—Sheet 1.
J. C. BARLOW.
ANCHOR FOR CHECK ROW PLANTERS.
No. 329,255. Patented Oct. 27, 1885.
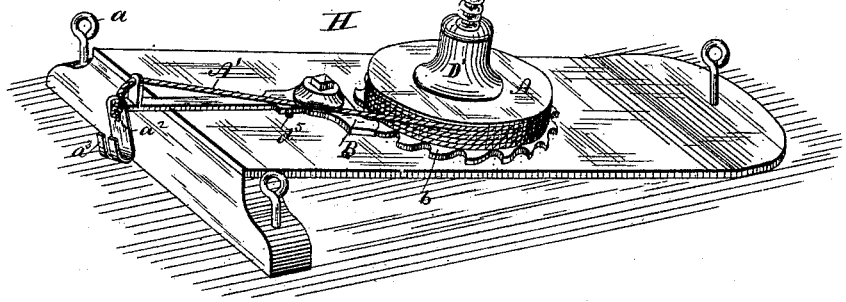
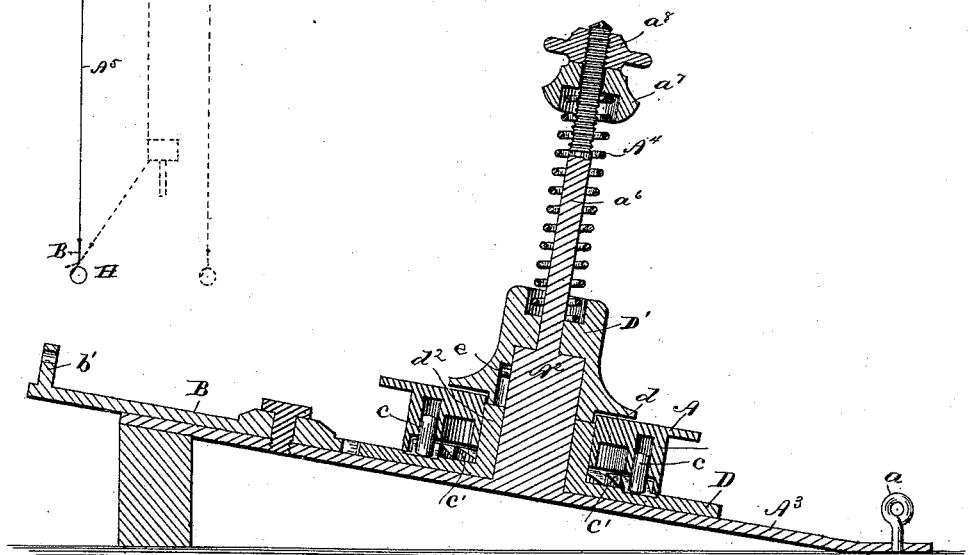
Witnesses.
Chas. R. Bill.
Fred J. Church.
Inventor.
Joseph C. Barlow,
By Church & Church
his Attorneys.

(No Model.) 2 Sheets—Sheet 2.
J. C. BARLOW.
ANCHOR FOR CHECK ROW PLANTERS.
No. 329,255. Patented Oct. 27, 1885.
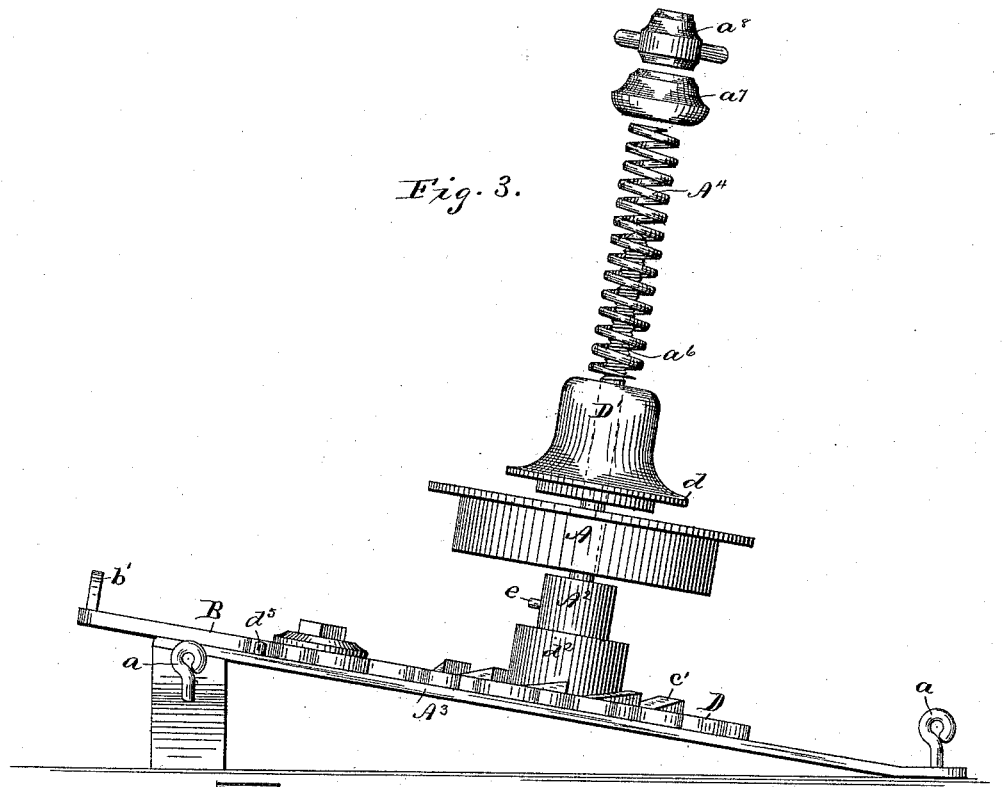
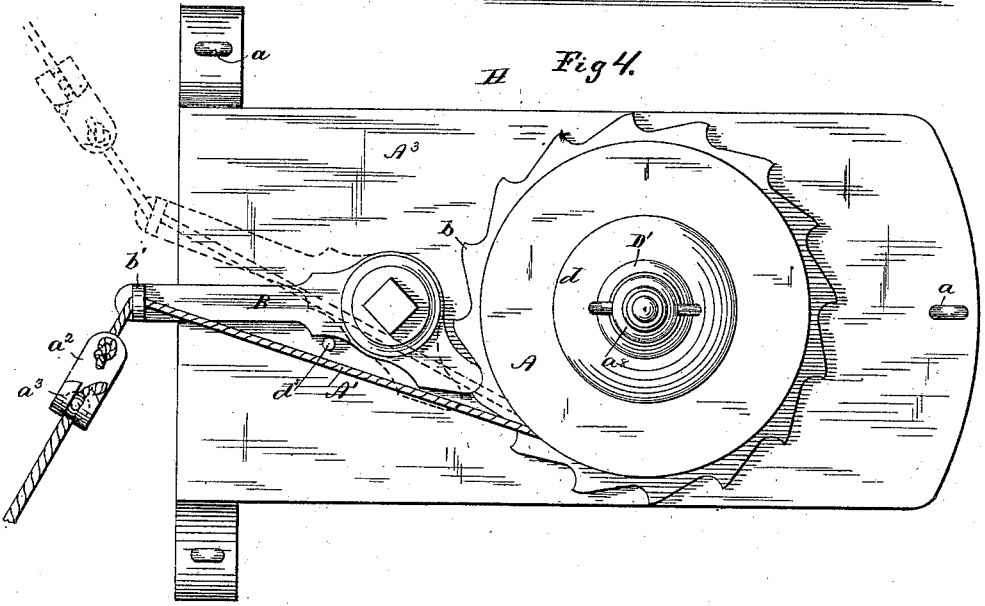
Witnesses.
Chas. R. Burr
Fred T. Church
Inventor.
Joseph C. Barlow.
By Church & Church
his Attorneys.

UNITED STATES PATENT OFFICE.

JOSEPH C. BARLOW, OF QUINCY, ILLINOIS.

ANCHOR FOR CHECK-ROW PLANTERS.

SPECIFICATION forming part of Letters Patent No. 329,255, dated October 27, 1885.

Application filed August 3, 1885. Serial No. 173,464. (No model.)

*To all whom it may concern:*

Be it known that I, JOSEPH C. BARLOW, of Quincy, in the county of Adams and State of Illinois, have invented certain new and useful Improvements in Automatic Tension and Extension Anchors for Check-Row Planters; and I do hereby declare the following to be a full, clear, and exact description of the same, reference being had to the accompanying drawings, forming a part of this specification, and to the figures and letters of reference marked thereon.

In operating check-row planters by or through the medium of a rope, wire, or the equivalents thereof, having knots or other protuberant portions located at regular and predetermined intervals to actuate the feeding mechanism, or a plain rope or wire operating by friction to drive the feeding mechanism, it is customary to extend the said rope or wire across the field and attach both ends to a stake or anchor to maintain the line in the desired position, and under a sufficient degree of tension to render it operative upon the feeding mechanism. If the planter is of that class wherein the check-row cord or wire is taken up on one side, passed across the machine, and laid on the ground on the opposite side, it approaches the anchors from either side of the field in approximately the same line, drawing or deflecting the check-row cord or wire to one side of the point of attachment but slightly, if at all. If, on the other hand, the planter is what is known as a "side-row" check-rower, or one in which the cord or wire is taken up and laid on the same side when the planter, after having traversed the field, is reversed preliminary to making its return-trip, it starts at from six to eight feet (more or less) to one side of the row previously planted, the anchor is carried over to a point in rear of the planter, and the check-row cord or wire is applied to the actuating mechanism located on the opposite side of the machine, opposite to that to which it was previously applied. When, now, the planter approaches the side of the field from whence it started, the anchor at that side remaining in rear of the row previously planted, the check-row cord or wire will be drawn over by the feeding mechanism toward the plane traversed by the planter on its return movement, thereby producing an undue tension upon the cord or wire, which tends not only to displace the knots, if such are employed, and break the cord or wire, but also to prevent the planter from proceeding to the extreme end of the row without first slackening the cord or wire or moving the anchor. In order to prevent this excessive strain upon the cord or wire when the planter is approaching the end of the row, and at the same time to maintain the requisite degree of tension on the same, is the object of my invention, and it is accomplished by securing the check-row cord or wire in such a manner that as the planter approaches the cord or wire will be elongated or paid out, and at the same time the requisite degree of tension to maintain the knots in operative position will be secured.

To this end the purpose of my present invention is to provide a device or attachment for receiving and holding each end of the rope or wire, which attachment shall be capable of withstanding the tension produced by the pull upon the rope or wire as the planter travels away from it, thereby forming an efficient anchor for the end of the rope or wire, and which shall, as the planter approaches it, automatically yield and permit the necessary amount of elongation or movement of the attached end of the rope or wire to accommodate the lateral strain due to the position of the planter, at the same time continuing or maintaining the requisite degree or amount of tension upon the rope or wire in advance of the planter to insure the proper action of the feeding mechanism; and it further relates to the provision made for taking up the slack and establishing the desired degree of tension on the rope or wire.

With this end in view my present invention comprehends the combination, with the rope or wire of a check-row planter, of devices to which the said rope or wire is attached or connected, and operating to maintain the latter securely in position to actuate the planting mechanism and to automatically yield or release the said rope or wire, at the same time maintaining the proper degree of tension as the planter approaches.

It also consists in the novel construction of the said device, and to the means devised for detachably securing the rope or wire and for producing the initial tension of the latter, together with other features of construction, as will be hereinafter described, and pointed out in the claims.

In the accompanying drawings, Figure 1 is a view in perspective of an anchoring device illustrating one mode of applying my said invention. Fig. 2 is a transverse section of the same, and Fig. 3 a side elevation showing the parts separated and in position to be associated together. Fig. 4 is a top plan view showing in dotted lines the ratchet as acted upon by the rope or wire. Fig. 5 is a diagrammatic view of the holder as applied in the field.

Similar letters of reference in the several figures indicate the same parts.

In carrying out my present invention three essential elements are required: first, a holder to receive or retain the end of the rope or wire; second, a brake or tension device preferably applied to the holder and operating to permit the withdrawal or elongation, as by unwinding, of the rope or wire; and, third, a catch or brake acted upon by the rope or wire and serving to automatically control the release or retention of said rope or wire to permit the necessary amount of relief.

In the example presented H designates the holder or anchoring device, consisting of a pulley or drum, A, upon which a rope, wire, or other flexible connection, A', is wound. This drum is mounted loosely upon a spindle, $A^2$, rising from the supporting-plate $A^3$, with which it is held in frictional contact by a spring, $A^4$, or other suitable form of adjustable brake mechanism, serving to restrain the unwinding of the rope or wire A' when pressure is applied thereto.

The automatic brake or catch for releasing or restraining the movement of the rope or wire A' is preferably applied to the drum A, and in the present instance it consists of a pawl, B, whose inner end co-operates with ratchet-teeth $b$, formed upon or applied to the drum A, and whose outer or free end carries a guide, $b'$, with which the rope or wire A' makes contact to withdraw the pawl from engagement with the drum or retain it in contact therewith.

As these three elements—the drum, the pawl, and the brake—represent the more important features of the invention and serve to illustrate the principle thereof, their mode of operation will be described before entering into the details of construction and additional features of improvement. The knotted cord or wire $A^5$, actuating the planter, is laid across the field, as usual, and is fastened at each end to one of the anchors, which latter are securely fastened in position, as by stakes or pins $a$ passing through a supporting-plate, $A^3$, and into the ground. Each end of the cord or wire $A^5$ may be wrapped around and secured to the drum A on one of the anchors H, if desired, or, as is preferred, clips or retaining-plates $a^2$, carrying hooks $a^3$, for engaging the knots on the said cord or wire $A^5$ may be secured to the ends of the ropes or wires A', the latter being applied to the drums A in the manner described. The anchors being properly located and fixed in position, the rope or wire A' is drawn taut between the two anchors or terminal stations, which can be accomplished either by winding it upon the drums A or shifting the knots in the hooks $a^3$.

When in position for operating the planter, the free ends of the pawls, or that portion carrying the guides $b'$, face or are in line with each other, and the point of the pawl engages the ratchet-teeth on the drum A, so that the latter is effectively prevented from rotating to release or permit the unwinding of the rope or wire so long as the strain is in a direct line with the free end of the pawl or in a direction to maintain the latter in contact with the ratchet-teeth. The check-row cord or wire being thus secured at each end and applied to the feeding mechanism of the planter, the latter is caused to traverse the space or interval between the two anchors. As before stated, the greatest strain or tension upon the rope or wire is borne by the anchor in rear of the planter, and that end of the rope or wire is firmly and securely held, the pawl being maintained in contact with the ratchet by the pressure of the rope or wire upon its free end. The opposite end of the rope or wire, or that toward which the planter is carried, is also and in like manner securely held and the initial tension maintained until the planter arrives at or near the end of the row to be planted, when, as it approaches the anchor, the latter being situated at one side of the line of movement of the planter, as described, it draws the rope or wire over toward it, and in so doing presses the pawl to one side and out of contact with the ratchet, thereby releasing the drum and permitting the cord or wire to be unwound, thus relieving the pressure or strain upon the rope or wire. The pawl being thus withdrawn from the ratchet by the lateral pressure of the rope or wire, the drum is free to rotate, and were no means provided for restraining or controlling its motion the tension on the rope or wire in advance of the planter would be practically removed, thereby interfering with or rendering irregular the action of the feeding mechanism. To guard against this I apply a brake to the drum, which, being properly adjusted, interposes a determinate resistance to the movement of the drum, thereby maintaining the requisite degree of tension upon the rope or wire as the latter is withdrawn from the drum. In this manner the strain upon the check-row cord or wire, due to its deflection, is not only automatically relieved and compensated for, but the requisite tension is at all times maintained to insure the proper action of the planter. When, now, the position of the planter is changed for the return-trip, it will by the pull of the cord or wire upon the pawl cause the latter to be brought into position to engage and hold the drum, thereby positively retaining that end of the rope or wire which is in rear of the planter, and as the latter approaches the opposite or starting point the drum on the anchor at that end will operate in the manner described relative to the first anchor.

As will be obvious to any one skilled in the art, the instrumentalities for effecting these new and useful operations may be greatly varied or modified, and numerous devices equivalent to those herein described by way of illustration can be employed for accomplishing the result without involving any material departure from the spirit of my present invention. As before stated, the ratchet-teeth $b$ may be applied directly to the flange of the drum A, in which case the slack in the check-row cord or wire can be taken up and a certain degree of tension secured by rotating the drum backward to wind up the rope or wire; but to facilitate this operation I prefer to make the ratchet separate from the drum and employ a pawl-and-ratchet connection, $c$ $c'$, whereby the drum can be turned back independently of the ratchet-plate, and while the pawl B is in engagement therewith. It is desirable, moreover, that this freedom of motion of the drum to wind up or establish a determinate degree of tension upon the rope or wire shall be unaffected by the application of the brake governing the movement of the drum when the pawl B is withdrawn; and to this end the following construction has been adopted: The ratchet-plate D is provided with a sleeve or boss, $d$, embracing the spindle $A^2$, and upon which the drum A fits and is free to revolve. Above the drum A, and held from rotation by a pin or stud, $e$, on the spindle $A^2$, is a cap or collar, D', having a frictional bearing upon the sleeve or boss $d$ of the ratchet-plate, and provided with a flange, $d^2$, for retaining the drum in position. The spindle $A^2$ is provided with a threaded extension, $a^6$, carrying the tension-spring $A^4$, the cap plate or washer $a^7$, and the adjusting-nut $a^8$. By adjusting the tension of the spring $A^4$ the degree of pressure exerted by the cap D' upon the sleeve or boss $d$ of the ratchet-plate D can be regulated and controlled at will, and the resistance thus offered to the rotation or unwinding of the cord or wire varied without affecting the freedom of rotation of the drum A upon the ratchet-plate. A stop, $d^5$, secured to the plate $A^3$, serves to prevent the pawl B from swinging back too far, at the same time permitting the cord or wire to pass freely through the guide $b'$ when the pawl is thus retracted. When from any cause an unusual strain is brought upon the check-row cord or wire, or the tension put upon the latter is excessive and it is desired to release it, the pawl B can be forced back and more or less of the cord or wire be permitted to unwind from the drum, and by properly regulating the strength of the pawl $c$ to resist the maximum strain which can safely be borne by the rope or wire without breaking they will by breaking, bending, or being severed operate to release the drum and permit the cord or wire to unwind without doing other and more serious damage to the machinery.

Having thus described my invention, what I claim as new is—

1. An anchor for a check-row cord or wire, provided with a holder for the rope or wire, and a device actuated by the said rope or wire for releasing said holder to automatically effect the release or withdrawal of the rope or wire, substantially as described.

2. An anchor for a check-row cord or wire, provided with a drum or holder to which the rope or wire is connected, a tension device for restraining the yielding of said holder, and a brake or stop mechanism engaging said holder to prevent the withdrawal of the check-row cord or wire until the latter has been deflected to one side, substantially as and for the purpose set forth.

3. An anchor for check-row cords or wires, provided with a holder to which the cord or wire is connected, a brake or catch applied to said holder and maintained in position to engage or disengage the latter by the cord or wire, and an adjustable brake or tension device acting upon the holder to resist the pull of the cord or wire when the said brake or catch is disconnected from the holder, substantially as described.

4. In an anchor for check-row cords or wires, the combination, with a rotary drum and its ratchet, of the pawl provided with guides or bearings for the rope or wire, substantially as described.

5. In an anchor for check-row cords or wires, the combination of the drum, the ratchet-plate to which the drum is attached by devices such as indicated for permitting an independent movement of the one with respect to the other, and a brake or catch applied to the said ratchet-plate and operated upon by the rope or wire, substantially as and for the purpose set forth.

6. In an anchor for check-row cords or wires, the combination of a rotary drum to which the wire is applied, a ratchet-plate with which said drum is connected by devices such as described to permit an independent motion in one direction, a brake or catch engaging said ratchet-plate, and a frictional brake or tension device applied to the said ratchet-plate independent of the drum, substantially as described.

7. In combination with the check-row cord or wire, and as a means for automatically securing and releasing the ends thereof, an anchor, substantially such as indicated, attached to each end of the said check-row cord or wire, said anchors being provided with devices for automatically holding and releasing the check-row cord or wire and maintaining the tension of the latter, substantially as described.

8. In combination with the ratchet-plate and its sleeve or boss surrounding the spindle, the drum loosely mounted upon said sleeve and connected to the ratchet-plate by a pawl, and the cap held in frictional contact with the sleeve, substantially as described.

9. In combination with the pawl and ratchet-plate, the former provided with a guide for the rope or wire, and actuated thereby, as described, the drum connected to the ratchet-plate and movable thereon in one direction only, and the brake applied to the said ratchet-plate to maintain the tension on the rope or wire when the pawl is withdrawn, substantially as described.

10. In an anchor for a check-row cord or wire, and in combination with the device to which the said cord or wire is attached, a retaining-catch adapted to be operated upon by the rope or wire when deflected to one side to release the said check-row cord or wire and permit the latter to be extended, substantially as described.

11. In an anchor for check-row cords or wires, and in combination with a device for holding the rope or wire and maintaining it under tension, a detaining-catch for holding the rope or wire in position, provided with a guide against which the rope or wire operates when deflected to effect the release of the latter and permit the elongation or paying out of the check-row cord or wire, substantially as described.

12. In an anchor for check-row cords or wires, a rotary holder upon which the end of the rope or wire is wound, and devices, substantially as indicated, for automatically locking and unlocking said holder by the lateral movement of the rope or wire.

13. In an anchor for check-row cords or wires, a rotary holder upon which the end of the rope or wire is wound, a device for automatically locking or releasing said holder by the lateral movement of the rope or wire, and a ratchet-and-pawl connection between said holder and locking mechanism to permit an independent rotation of the former for tightening the rope or wire, substantially as described.

14. The combination, in an anchor such as described, and with the check-row cord or wire, of a rotary drum or holder to which the cord or wire is attached, a movable detent or catch applied to the holder, and operating to prevent the movement of the latter when in engagement therewith, and a tension device applied to the holder and operating, when the detent or catch is released, to restrain or retard the unwinding of the drum and the extension of the cord, as and for the purpose set forth.

15. In combination with the ratchet-plate and its engaging pawl or detent, the drum loosely connected to said plate and capable of rotating in one direction independently of said ratchet-plate, and the tension device applied to the ratchet-plate, substantially as described, whereby when the pawl or detent is withdrawn the ratchet-plate and drum will rotate in unison, but against the pressure of the tension device, while the drum is free to turn in the opposite direction to wind up the cord or wire independently of the tension device or ratchet-plate.

JOSEPH C. BARLOW.

Witnesses:
EDWARD J. PARKER,
LEWIS B. BOSWELL.